United States Patent
Everitt, Jr.

(10) Patent No.: US 11,272,023 B1
(45) Date of Patent: Mar. 8, 2022

(54) PARENTAL MONITORING OF MULTIPLAYER GAME CHAT

(71) Applicant: CHATSAFE Inc., Lewes, DE (US)

(72) Inventor: David Everitt, Jr., Clarkdale, AZ (US)

(73) Assignee: GameSafe Inc., The Woodlands, TX (US)

( * ) Notice: Subject to any disclaimer, the term of this patent is extended or adjusted under 35 U.S.C. 154(b) by 0 days.

(21) Appl. No.: 17/003,785

(22) Filed: Aug. 26, 2020

(51) Int. Cl.
*H04L 29/08* (2006.01)
*H04L 67/50* (2022.01)
(Continued)

(52) U.S. Cl.
CPC .............. *H04L 67/22* (2013.01); *A63F 13/73* (2014.09); *A63F 13/87* (2014.09); *G06K 9/3258* (2013.01); *G06N 3/08* (2013.01); *G06N 20/10* (2019.01); *H04L 67/10* (2013.01); *H04L 67/125* (2013.01); *A63F 2300/535* (2013.01); *A63F 2300/572* (2013.01)

(58) Field of Classification Search
CPC ....... H04L 67/22; H04L 67/10; H04L 67/125; A63F 13/87; A63F 13/73; A63F 2300/572; A63F 2300/535; G06K 9/3258; G06N 20/10; G06N 3/08
See application file for complete search history.

(56) References Cited

U.S. PATENT DOCUMENTS 7,640,336 B1 12/2009 Lu et al.
8,306,255 B1 11/2012 Degan
(Continued)

FOREIGN PATENT DOCUMENTS

CN 112926407 A * 6/2021
JP 2005531072 A 8/2007
WO 2019082191 A1 5/2019

OTHER PUBLICATIONS

Frommholz et al., On Textual Analysis and Machine Learning for Cyberstalking Detection, Datenbank Spektrum, 2016; 16(2):127-135. doi:10.1007/s13222-016-0221-x accessed on Jul. 13, 2020 from https://pubmed.ncbi.nlm.nih.gov/29368749/.
(Continued)

*Primary Examiner* — Michael A Keller
(74) *Attorney, Agent, or Firm* — Morgan Law Offices, PLC

(57) ABSTRACT

A background application running on a child computing device periodically takes screenshots which are samples of what the child is viewing. If the child is playing a video game, text can be extracted from the screenshot within areas of the screen that chat is known to be displayed for the particular game. A cloud computing platform provides services for machine learning (ML) to analyze the chat text to ascertain a likelihood that the chat includes bullying or sexual predation. If it appears likely, the game is disabled and a notification is sent to a parental monitoring application along with a copy of the offensive chat. The parent can override the determination, and in this case, the user application running on the child computing device is re-enabled. The parent's action either to override the determination or to let it stand is then fed back to the ML model so that the ML model continues to learn the semantics of in-game chat based on the parental feedback.

8 Claims, 5 Drawing Sheets

(51) Int. Cl.
*A63F 13/87* (2014.01)
*A63F 13/73* (2014.01)
*H04L 67/10* (2022.01)
*G06K 9/32* (2006.01)
*G06N 3/08* (2006.01)
*G06N 20/10* (2019.01)
*H04L 67/125* (2022.01)

(56) References Cited

U.S. PATENT DOCUMENTS

| | | |
|---|---|---|
| 10,298,700 B2 | 5/2019 | Borden et al. |
| 11,019,015 B1* | 5/2021 | Shapira .................... H04L 51/12 |
| 2009/0089417 A1 | 4/2009 | Giffin et al. |
| 2016/0099892 A1 | 4/2016 | Palakovich et al. |
| 2020/0387995 A1* | 12/2020 | Bucciarelli ............. H04W 4/14 |

OTHER PUBLICATIONS

Sarah Perez, Bark helps parents keep kids safe online without invading their privacy, TechCrunch, May 10, 2016, accessed on Jul. 13, 2020 from https://techcrunch.com.

* cited by examiner

PARENTAL MONITORING OF MULTIPLAYER GAME CHAT

FIELD

The present invention relates to computer video games, and more particularly, to parental monitoring of in-game chat.

DESCRIPTION OF THE RELATED ART

Most multiplayer online games provide chat capability. In the context of online games, chat generally refers to a group of players exchanging text messages that are displayed in a scrollable area of the screen. To facilitate the flow of a conversation, each message is shown next to the player's username. Messages are displayed as they are received.

Chatting has its own slang and acronyms. As an example, instead of saying "You look great," the sentence "U look gr8" might be used. Various acronyms such as "lol" (laugh out loud), "fwiw" (for what it's worth), and "tyvm" (that you very much), are also frequently used. Chat lingo can also have "hidden meaning" such as the phrase "Netflix and chill" which sometimes is used as a euphemism for sexual activity.

Although in-game chatting can be fun and exciting, sometimes one or more participant is disruptive, bullying, or even acting in a sexually predatory manner. In the case of the sexual predator, the user may be an adult who is posing as a teen to lure a minor. There are extreme cases of suicide linked to cyberbullying and molestation or worse in the case of sexual predation. To address the foregoing, some online multiplayer games provide a degree of message filtering. However, message filtering is limited to filtering out offensive words or phrases. Message filtering doesn't address the underlying semantics of the chat interactions and regional differences in usages and meanings that might exist.

SUMMARY

A background application running on a child computing device periodically takes screenshots which are samples of what the child is viewing. If the child is playing a video game, text can be extracted from the screenshot within areas of the screen that chat is known to be displayed for the particular game. A cloud computing platform provides services for machine learning (ML) to analyze the chat text to ascertain a likelihood that the chat includes bullying or sexual predation. If it appears likely, the game is disabled and a notification is sent to a parental monitoring application along with a copy of the offensive chat. The parent can override the determination, and in this case, the user application running on the child computing device is re-enabled. The parent's action either to override the determination or to let it stand is then fed back to the ML model so that the ML model continues to learn the semantics of in-game chat based on the parental feedback.

DETAILED DESCRIPTION

Figure 1:
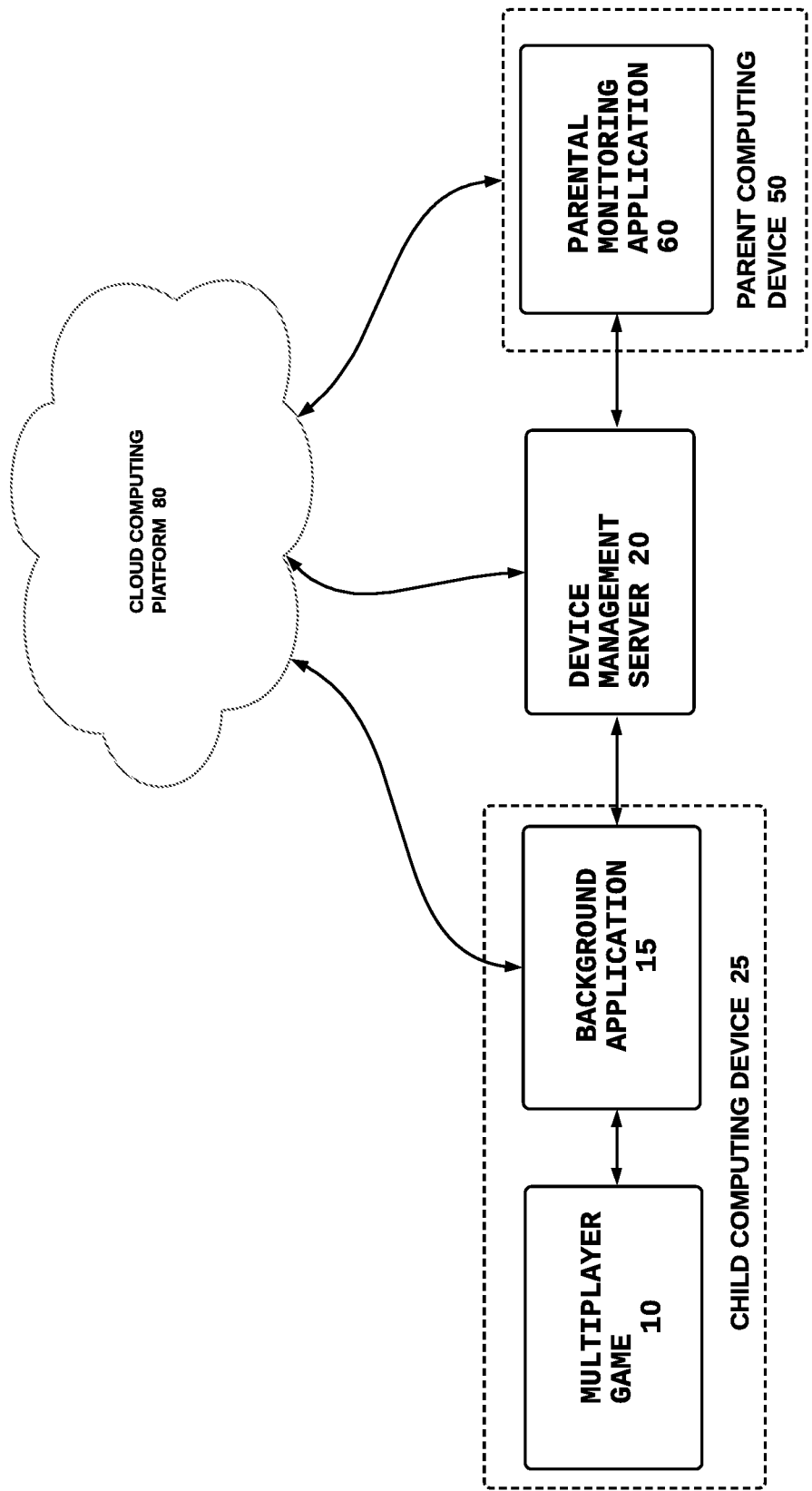
FIG. 1 illustrates an example system for monitoring multiplayer online game chat, according an embodiment.

Referring to FIG. 1, an example system for monitoring multiplayer online game chat 100, according an embodiment, is illustrated. As shown, the example system for monitoring multiplayer online game chat 100 includes a child computing device 25, a parent computing device 50, a device management server 20, and a cloud computing platform 80. The child computing device 25 and the parent computing device 50 can be a smartphone, a tablet, a laptop, a desktop, or the like. The child computing device 25 executes various foreground user applications and a background application 15 is associated with the user applications. The user applications can include one or more multiplayer game 10 running on the child computing device 25. The device management server 20 establishes a hierarchical relationship between the parental computing device 50 and the child computing device 25 such that the parent computing device 50 can control the child computing device 25, including the ability to disable (or re-enable) an application executing on the child computing device 25. An example of such commercially available device management server is Cisco Meraki by Cisco Systems, Inc.

The cloud computing platform 80 can include a suite of services executed remotely via the Internet. As used generally, "cloud computing" refers to accessing via the Internet storage and processes that reside remotely, as opposed to doing so on local or locally networked computing devices. Examples of such commercially available cloud computing services include Amazon Web Services (AWS) from Amazon.com, Inc.; Microsoft Azure from Microsoft Corporation; Google Cloud Platform from Google LLC; and IBM Cloud from IBM Corporation.

As will be described in greater detail, a background application 15 takes screenshots from the child computing device 25 periodically, which are samples of what the child is viewing. If a screenshot corresponds to a supported video game being executed on the child computing device 25, it will be sent to the cloud computing system 80 along with meta data including the game platform (e.g., Minecraft Pocket 1.16.21 for Android), timestamp, and user id. (However, depending on operating system (e.g., Apple iOS), the identity of the currently running application may not be available, in which case the cloud-based platform 80 will have to analyze the screenshot to determine whether it corresponds to a supported video game).

For screenshots matching supported games, the cloud computing platform 80 determines the location of the chat text within the screenshot based on the identified game platform and known bounded areas (of the screen where chat is located for the game platform, and extracts the chat text into a file which is then stored. Thereafter, a machine learning (ML) model is instantiated based on the identified game and a geographic region. The ML model intelligently analyzes each line of chat to assess a likelihood that the chat is bullying or sexually predatory. If the likelihood value exceeds a predetermined threshold, the current user application (the video game) running on the child computing device 25 is disabled and a notification is sent to the parental monitoring application 50 to this effect along with a copy of the offensive chat. A parent can override the determination, and in that case, the user application running on the child computing device 25 is re-enabled. The parent's action either to override the determination or to let it stand is then fed back to the ML model so that the ML model continues to learn the semantics of in-game chat based on the parental feedback. It is to be understood that although the word "parent" is used herein, any person in the role of being responsible for the child, including a teacher, a baby sitter, or another adult family member, may use the parental monitoring application in the same way as a parent. Furthermore, although the word "child" is used herein, any person in need of such supervision may be monitored in the same way as the child.

The example system for monitoring multiplayer online game chat 100 described herein includes a distributed application which is partitioned between a service provider (cloud computing platform 80) and a service requester (parental computing device 50). Under this arrangement, a request-response protocol, such as hypertext protocol (HTTP), can be employed such that a requester (parental computing device 50) can initiate requests for services from the service provider (cloud computing platform 80), and the service provider (cloud computing platform 80) can respond to each respective request by, for example, performing a service, and (where appropriate) sending results to the client (parental computing device 50). It is to be understood that in some embodiments, however, substantial portions of the application logic may be performed on the requester side using, for example, the AJAX (Asynchronous JavaScript and XML) paradigm to create an asynchronous web application. Furthermore, it is to be understood that in some embodiments one or more services can be distributed among a plurality of different servers (not shown).

In the present description of the present invention, example methods for performing various aspects of the present invention are disclosed. It is to be understood that the steps illustrated herein can be performed by executing computer program code written in a variety of suitable programming languages, such as C, C++, C#, Visual Basic, and Java. It is also to be understood that the software of the invention will preferably further include various Web-based applications that can be written in HTML, PHP, Javascript, jQuery, etc., accessible by the clients using a suitable browser 145 (e.g., Internet Explorer, Microsoft Edge, Mozilla Firefox, Google Chrome, Safari, Opera) or as an application running on a suitable mobile device (e.g., an iOS or Android "app").

As mentioned herein machine learning (ML) is employed as a service by the cloud computing platform 80 to determine the semantic meaning of in-game chat. ML can include text classification for example to tag words or phrases, or combinations thereof, indicative of bullying or predatory comments. The ML model chosen can employ deep learning algorithms such as a convolutional neural network (CNN) or a recurrent neural network (RNN), a support vector machine (SVM), or a Bayesian Network. Moreover, the ML model can be a hybrid including one or more category of algorithm, e.g., a rules-based algorithm and an ML model. The ML model can be implemented using various available software tools such as Amazon Sagemaker Studio which is an integrated development environment (IDE) for machine learning, available through Amazon Web Services (AWS).

Figure 2:
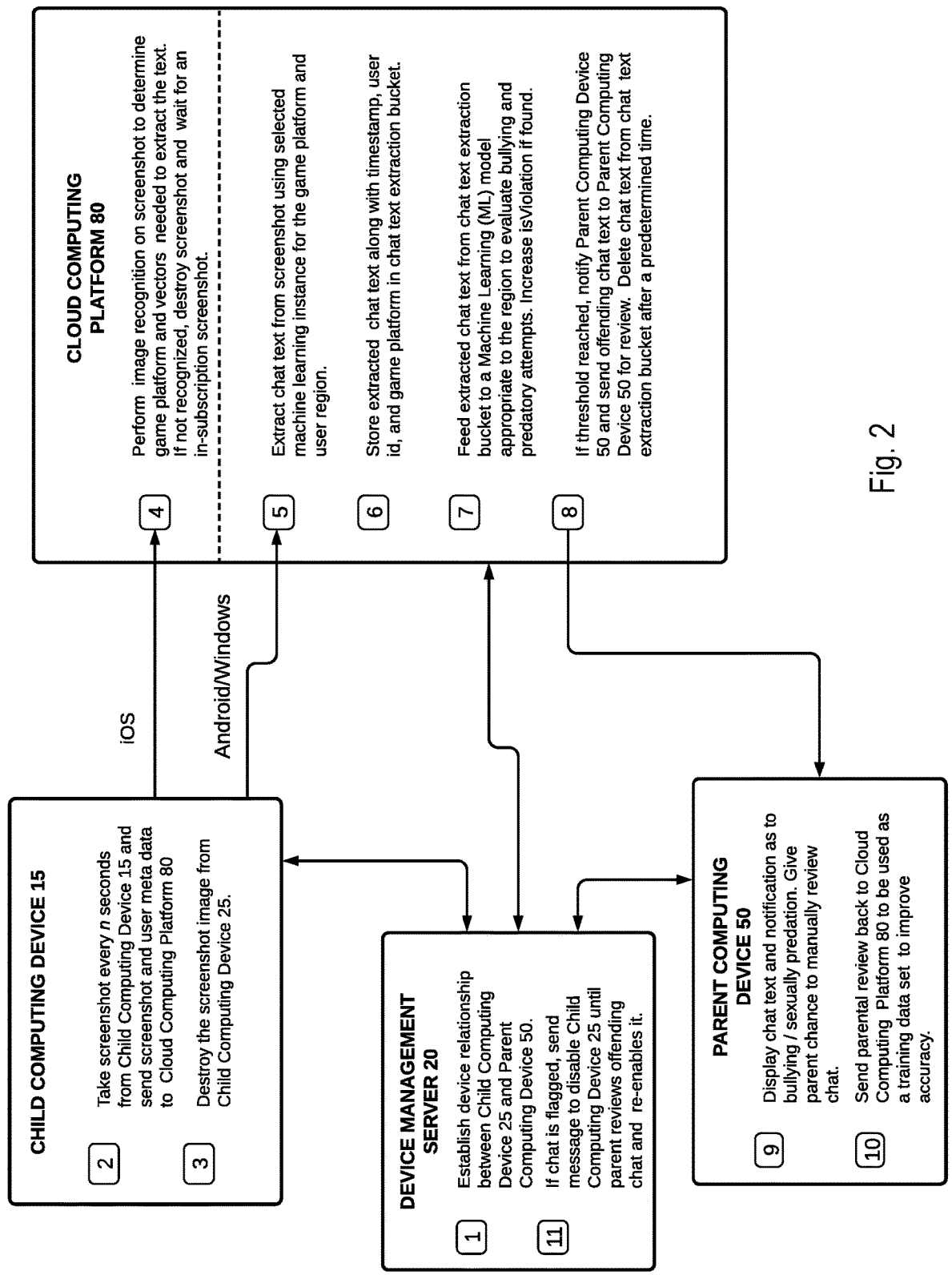
FIG. 2 illustrates an example data flow diagram used in an implementation of the system for monitoring multiplayer online game chat, according to an embodiment.

Referring to FIG. 2, an example data flow diagram used in an is implementation of the system for monitoring multiplayer online game chat 100 is illustrated. Method steps (processes) are numbered consecutively so as to illustrate processing order.

Process-1: The device management server 20 establishes a "master/slave" relationship between the child computing device 25 and the parent computing device 50. This relationship allows the parent computing device 50 to control the child computing device 25.

Process-2: The background application 15 takes screenshots from the child computing device 25 periodically. Depending on operating system (e.g., Apple iOS), the cloud-based platform 80 may have to analyze the screenshots to determine whether they match a particular game. In most cases (e.g., Android, Windows) the currently running process will be known, and if it matches a supported game platform, the child computing device 25 sends the screenshot along with meta data including the game platform, userid, and timestamp to the cloud computing platform 80. The table below summarizes the information passed to the cloud-based platform 80 for Android/Windows and iOS operating systems.

TABLE 1

| Android/Windows | iOS |
| --- | --- |
| Bypasses Process 4. | Sends to Process 4 via a REST call: Screenshot image file with metadata including user id and timestamp. |
| If current process matches a supported game, sends to Process 5 via a REST call: Screenshot image file with metadata including user id, timestamp, game platform. | Executes Process 5 after Process 4 unless screenshot is found not to be associated with a supported game. |

Process-3: Once an HTTP 200 status is received indicating that the REST call to the cloud-based platform 80 was successful, the screenshot copy on the child computing device 50 is destroyed.

Figure 3:
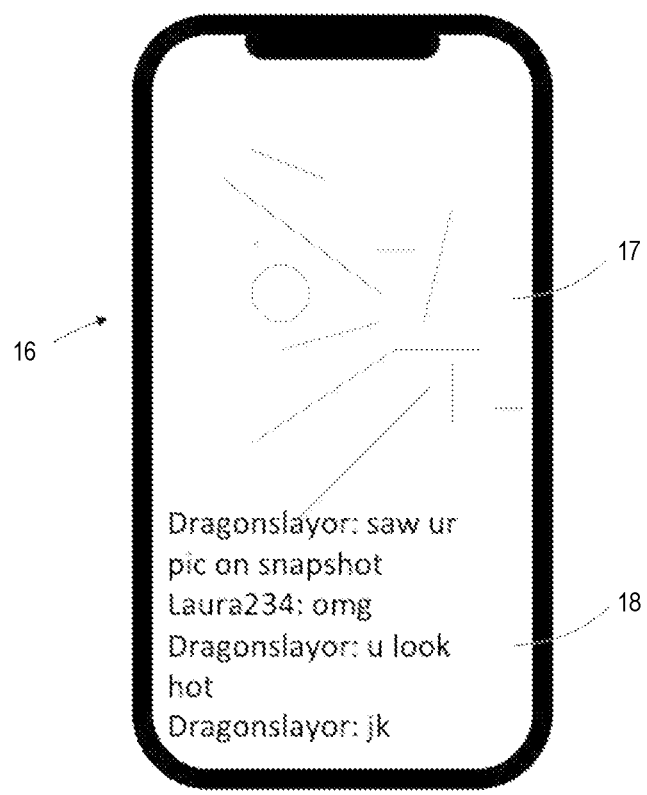
FIG. 3 illustrates an example mobile device screen showing an example in-game chat, according to an embodiment.

Process-4: Image recognition is performed on the screenshot to determine the game platform and vectors needed to extract the chat text. If the game platform is not recognized, the screenshot is destroyed and the process waits for an in-subscription screenshot. FIG. 3, illustrates an example screenshot 16. The example screenshot 16 includes a game play portion 17 and a chat portion 18.

Process-5: Chat text is extracted from the screenshot using a selected machine learning instance for the game platform and user region. From the game platform, the bounded areas of the image where the chat box are known to be located are scanned using OCR or similar techniques.

Process-6: The extracted chat text is stored along with the timestamp, user id, and game platform in a chat text extraction bucket.

Process-7: The chat text from chat text extraction bucket is fed to a Machine Learning (ML) model appropriate to the geographic region to evaluate bullying and predatory attempts.

Process-8: If a predetermined likelihood threshold is reached, the parent computing device 50 is notified and the offending chat text is sent to the parent computing device 50 for review. The chat text in the chat text extraction bucket is destroyed after a predetermined time.

Figure 4:
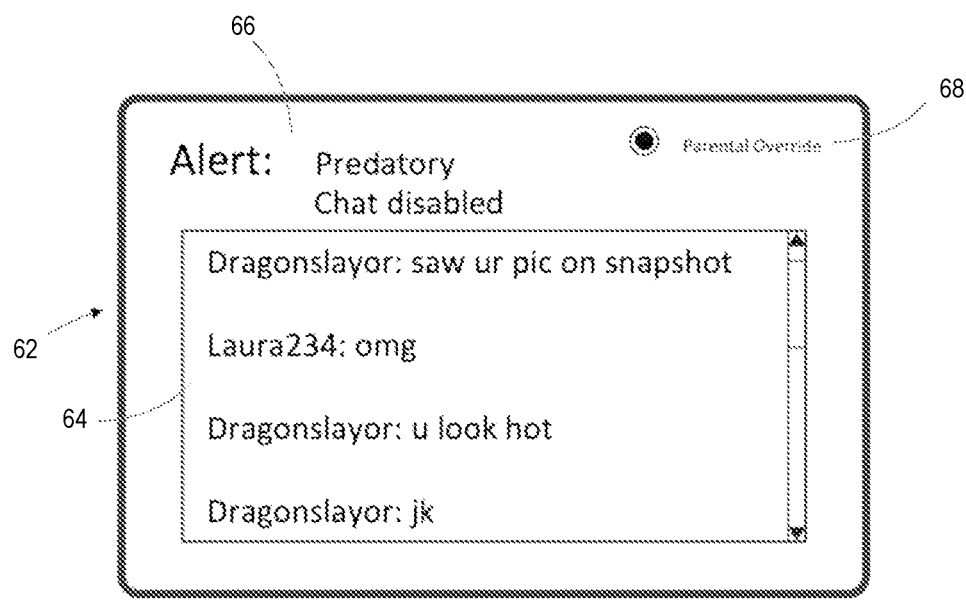
FIG. 4 illustrates an example parental monitoring screen, according to an embodiment.

Process-9: The parent computing device displays the notification and offending chat text, as illustrated in FIG. 4. As shown in FIG. 4, example screen 62 displays an alert message 66 along with the actual offending text message 64. In this case, the ML model determined that there was a likelihood that the chat was leading in a sexual direction since one player (Dragonslayer) had commented on a photo that he viewed without apparent knowledge of the child (Laura234), and commented, "U look hot". However, the player (Dragonslayer) added "jk," meaning "just kidding," so reviewing the chat, the parent decided the conversation was innocuous, clicking radio button 68 to override the determination.

Process-10: The parental review is sent back to the cloud computing platform 80 to be used as a training data set to improve accuracy. In the example, an indication as to whether the parent clicked on the radio button 68 is sent to the cloud computing platform.

Process-11: On a determination that the chat is bullying or sexually predative, a message is sent to disable the child computing device 25 until the parent reviews offending chat and re-enables it.

Figure 5:
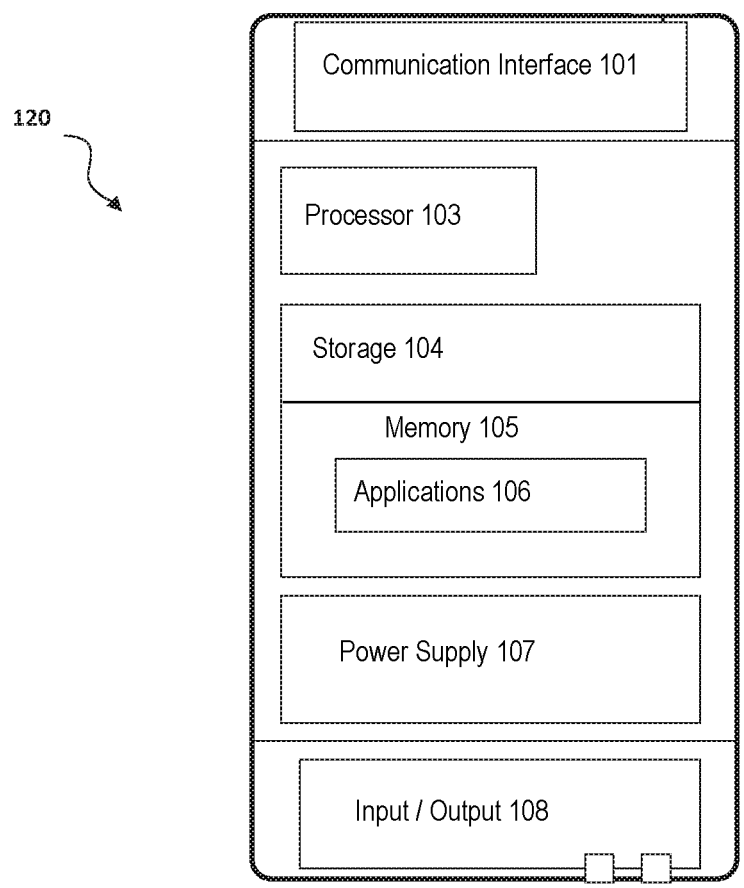
FIG. 5 illustrates a block diagram showing the architecture of a computing device useable in conjunction with the present invention.

Referring to FIG. 5, a block diagram showing the basic architecture of computing devices useable in conjunction with the present invention is illustrated. As depicted, the example computing device 120 includes a communication interface 101, a processor 103, storage, memory 105, a power supply 107, and input/output 109. In an embodiment where the computing device is a smartphone, the communication interface 101 includes a cellular transmitter and receiver. The devices can include a Wi-Fi or ethernet communication interface, for example. Processor 103 includes at least one central processing unit (CPU). The storage 104 can include any suitable hard drive or SSD drive, or in the case of the Cloud-based Platform 80, various bulk storage devices may be used. The memory can include ROM/RAM, flash memory and the like. The power supply 109 can include a re-chargeable battery and power charger, in the case of user devices. Applications 106 are stored in the memory 105, and include program code non-transitorily embedded thereon. This program code includes various programs executable by the processor 103.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for monitoring in-game chat, comprising:
    a child computing device including a display, the child computing device capable of executing user applications and a background application periodically taking screenshots of the display;
    a parent computing device in communication with the child computing device, the child computing device executing a parental monitoring application;
    a device management server that establishes a master/slave relationship between the child computing device and the parent computing device; and
    a cloud computing platform assisting the parental monitoring application that is configured to:
        for the screenshots associated with an identified game, extract chat text from bounded areas of the screenshots, the bounded areas defined based on the identified game;
        feed the extracted chat text to a machine learning model to evaluate one or more of bullying and predation;
        determine a likelihood of one or more of bullying and predation based on the evaluation; and
        notify the parent computing device, if the determined likelihood exceeds a predetermined threshold;
    wherein the device management server causes the identified game executing on the child computing device to be disabled when the determined likelihood exceeds the predetermined threshold.

2. The system for monitoring in-game chat of claim 1, wherein the identified game is provided to the cloud computing platform by the child computing device.

3. The system for monitoring in-game chat of claim 1, wherein the identified game is determined by the cloud computing platform based on image analysis of one or more of the screenshots.

4. The system for monitoring in-game chat of claim 1, wherein the machine learning includes one or more of a convolutional neural network (CNN), a recurrent neural network (RNN), a support vector machine (SVM), and a Bayesian Network.

5. The system for monitoring in-game chat of claim 1, wherein the parent computing device allows a parent to override the determined likelihood.

6. The system for monitoring in-game chat of claim 5, wherein the override is used to train the machine learning model.

7. The system for monitoring in-game chat of claim 5, wherein the lack of an override is used to train the machine learning model.

8. The system for monitoring in-game chat of claim 5, wherein, responsive to the override, the device management server causes the identified game to be re-enabled on the child computing device.

* * * * *